United States Patent [19]
Annapragada

[11] Patent Number: 6,048,494
[45] Date of Patent: Apr. 11, 2000

[54] AUTOCLAVE WITH IMPROVED HEATING AND ACCESS

[75] Inventor: Rao Venkateswara Annapragada, San Jose, Calif.

[73] Assignee: VLSI Technology, Inc., San Jose, Calif.

[21] Appl. No.: 09/016,752

[22] Filed: Jan. 30, 1998

[51] Int. Cl.$^7$ .................................. A61L 2/04; A61L 2/06
[52] U.S. Cl. ............................... 422/33; 422/26; 422/296; 422/297; 422/307; 220/203.01; 220/211; 220/240; 220/252; 49/254
[58] Field of Search ...................... 422/26, 33, 295–297, 422/300, 307; 220/202, 203.01, 211, 240, 252; 49/254

[56] References Cited

U.S. PATENT DOCUMENTS

| | | | |
|---|---|---|---|
| 643,949 | 2/1900 | Deane | 422/296 |
| 3,681,008 | 8/1972 | Black | 422/296 |
| 4,228,135 | 10/1980 | Wolff | 422/296 |
| 4,256,701 | 3/1981 | Johansson | 422/295 |
| 4,426,358 | 1/1984 | Johansson | 422/296 |

*Primary Examiner*—Robert J. Warden, Sr.
*Assistant Examiner*—Fariborz Moazzam
*Attorney, Agent, or Firm*—Wagner, Murabito & Hao LLP

[57] ABSTRACT

An autoclave is disclosed which includes direct heating and improved access. The autoclave includes a heating system which is placed directly into the pressurized chamber such that materials which are placed directly into the autoclave are directly heated. The autoclave includes doors which are disposed inside of the pressure vessel which seal against the inside surface of the pressure vessel upon pressurization. In one embodiment a pivot system is used to hold the door in place when the autoclave is not sufficiently pressurized so as to hold the door against the inside wall of the autoclave. In an alternate embodiment a robotic system is used to hold the door in place when the autoclave is not sufficiently pressurized so as to hold the door against the inside wall of the autoclave. The robotic system is also used to move the door out of the way after depressurization.

5 Claims, 15 Drawing Sheets

AUTOCLAVE WITH IMPROVED HEATING AND ACCESS

TECHNICAL FIELD

This invention relates to the field of semiconductor fabrication devices and systems. More particularly, the present invention relates to an improved autoclave for applying heat and pressure to semiconductor wafers.

BACKGROUND ART

In recent years semiconductor devices have become smaller and smaller in order to increase the number of semiconductor devices on each wafer and in order to form more complex semiconductor devices. In order to make smaller semiconductor devices, new materials and processing techniques are continually being developed. One new processing material which is desirable for use in semiconductor manufacturing processes is aerogel films.

At present, aerogel films are difficult to manufacture and are expensive to manufacture. One of the primary reasons that the manufacture of aerogel films is difficult and expensive is the requirement that the aerogel film be cured under super critical conditions. These super critical conditions include high temperature and high-pressure requirements. Typically, a temperature of over 100 degrees centigrade and a pressure of over 1500 pounds per square inch is required for curing an aerogel film.

In a typical prior art process for curing an aerogel film, one or more semiconductor wafers are placed into an autoclave immediately after the application of the aerogel film to the semiconductor wafer. The process of sealing the autoclave is time consuming. In addition, the heating process is inefficient and takes a relatively long time because the entire pressure vessel of the autoclave must be heated. Moreover, the process of unsealing the autoclave is also time consuming. This makes the use of aerogel films impractical for use in modern high speed manufacturing processes.

A typical prior art autoclave is shown in FIG. 1a. Autoclave 1 is shown to include pressure vessel 3 which is disposed within frame 2. Heating system 4 is shown to surround the exterior of pressure vessel 3. Tubing 6 allows for gas to be pumped into, and removed from pressure vessel 3. In one prior art method for curing an aerogel film, an inert gas such as nitrogen is used as a medium. Door 5 fits over the top of pressure vessel 3 so as to enclose pressure vessel 3. Nuts 9 are screwed over bolts 7 so as to hold door 5 tightly against pressure vessel 3. Semiconductor wafers 10 are shown to be disposed on cassette tray 11 which is placed within pressure vessel 3.

With reference now to prior art FIG. 1b, a bottom view of top 5 is shown including openings 8. In operation, pressure vessel 3 is enclosed by placing top 5 of prior art FIG. 2 such that openings 8 fit over bolts 7 of FIG. 1. Next, each nut 9 of FIG. 1a must be placed over one of bolts 7 and each individual nut 9 must be separately tightened. Due to the high-pressure that is to be applied to pressure vessel 3, each nut 9 must be carefully tightened using a wrench. This is a time-consuming process. Unless each nut is sufficiently tightened, a leak will result which will prevent full pressurization.

Next, referring again to FIG. 1a, an inert gas is pumped through one of tubes 6 to us to apply a pressure of 1,500 pounds per square inch within pressure vessel 3. Heating system 4 is activated such that heat is applied to pressure vessel 3. Heating system 4 heats pressure vessel 3. The heat moves through the walls of pressure vessel 3 so as to heat the inside of pressure vessel 3, thereby heating semiconductor wafers 10.

After the curing process is complete, the pressure is released through one of tubes 6 and heating system 4 is deactivated. In order to remove the semiconductor wafers from pressure vessel 3, each of nuts 9 must first be removed using a wrench. Then, door 5 is removed which then allows the semiconductor wafers to be removed from pressure vessel 3. This is a time-consuming process. Thus, this process is unsuitable for use in conjunction with current mass production methods for producing semiconductor devices. In addition, this type of autoclave is inefficient due to the fact that the heating system 4 must heat pressure vessel 3 in order to heat the interior of pressure vessel 3.

What is needed in is an autoclave which will allow for the mass production of semiconductor devices. More particularly, an autoclave is needed which can be easily sealed and unsealed and which can provide for increased throughput. In addition, an autoclave is needed which can efficiently and quickly heat semiconductor wafers. The present invention meets the above needs.

DISCLOSURE OF THE INVENTION

The present invention includes an autoclave which allows for the quick and efficient heating of semiconductor wafers and which is easily sealed and unsealed.

An autoclave is disclosed which includes a pressure vessel which is disposed within a frame and a heating system which is contained with the pressure vessel itself. An opening within the pressure vessel allows for semiconductor wafers to be placed within the autoclave and removed therefrom. The autoclave of the present invention also includes a door which fits within the autoclave such that the door may be pressed against the interior surface of the pressure vessel so as to cover the opening in the pressure vessel. Upon the application of pressure to the pressure vessel, the pressure forces the door against the interior surface of the pressure vessel so as to form is an airtight seal. Upon the completion of the curing process, the seal is automatically released as pressure is removed from the pressure vessel.

In one embodiment of the present invention, a pivoting holding assembly is disclosed which couples to the door for holding the door in place over the opening in the pressure vessel. This provides for proper replacement of the door until such time as the door is sealed by the application of pressure to the pressure vessel. In addition, the pivoting holding assembly prevents the door from falling into the pressure vessel as pressure is released, thereby preventing possible damage to any semiconductor wafers contained therein.

In another embodiment of the present invention, a robotic system is coupled to the door for selectively moving the door such that the door alternately covers the opening and uncovers the opening. Two types of robotic systems are disclosed, one which includes pivoting arms and one which uses a rail system. The use of a robotic system allows for full control of the movement of the door such that the door may be quickly opened and closed. This allows for cassettes containing semiconductor wafers to be easily moved in and out of the autoclave for rapid processing.

In one embodiment of the present invention a reticulating cassette tray is disclosed. The reticulating cassette tray is disposed with the pressure vessel proximate to an opening such that wafers may be quickly and efficiently loaded and unloaded from the cassette tray by an automated semiconductor wafer handling device.

In operation, in an embodiment that includes a reticulating cassette tray and a robotic system for controlling the movement of the door, the door is first moved from a first position in which it covers the opening to a second position in which it does not cover the opening in the pressure vessel. Semiconductor wafers are then placed on successive levels of the cassette tray as the cassette tray is moved up and down. Once the cassette tray is full, the door is moved into the closed position such that it covers the opening. The pressure vessel is then pressurized which seals the door against the inside surface of the pressure vessel. Heat is then applied to the wafers by a heating system located within the pressure vessel. Once the curing process is complete, the pressure is released, thereby breaking the seal between the door and the inside surface of the pressure vessel. The door is then moved into the open position such that it no longer covers the opening in the pressure vessel. The automated semiconductor wafer handling device then removes each of the wafers with the cassette tray moving up and down to position wafers to be removed.

Thus, the autoclave of the present invention is easily sealed and unsealed so as to allow for rapid processing of semiconductor devices. This allows for increased throughput and results in increased efficiency. In addition, because the heating system of the present invention directly heats the semiconductor wafers, increased heating efficiency is obtained. Moreover, because there is no need to heat the entire pressure vessel, the present invention more quickly heats wafers to the required temperature. This also increases throughput and efficiency. Thus, the present invention provides for the mass manufacture of semiconductor wafers containing aerogel films.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Figure 1A:
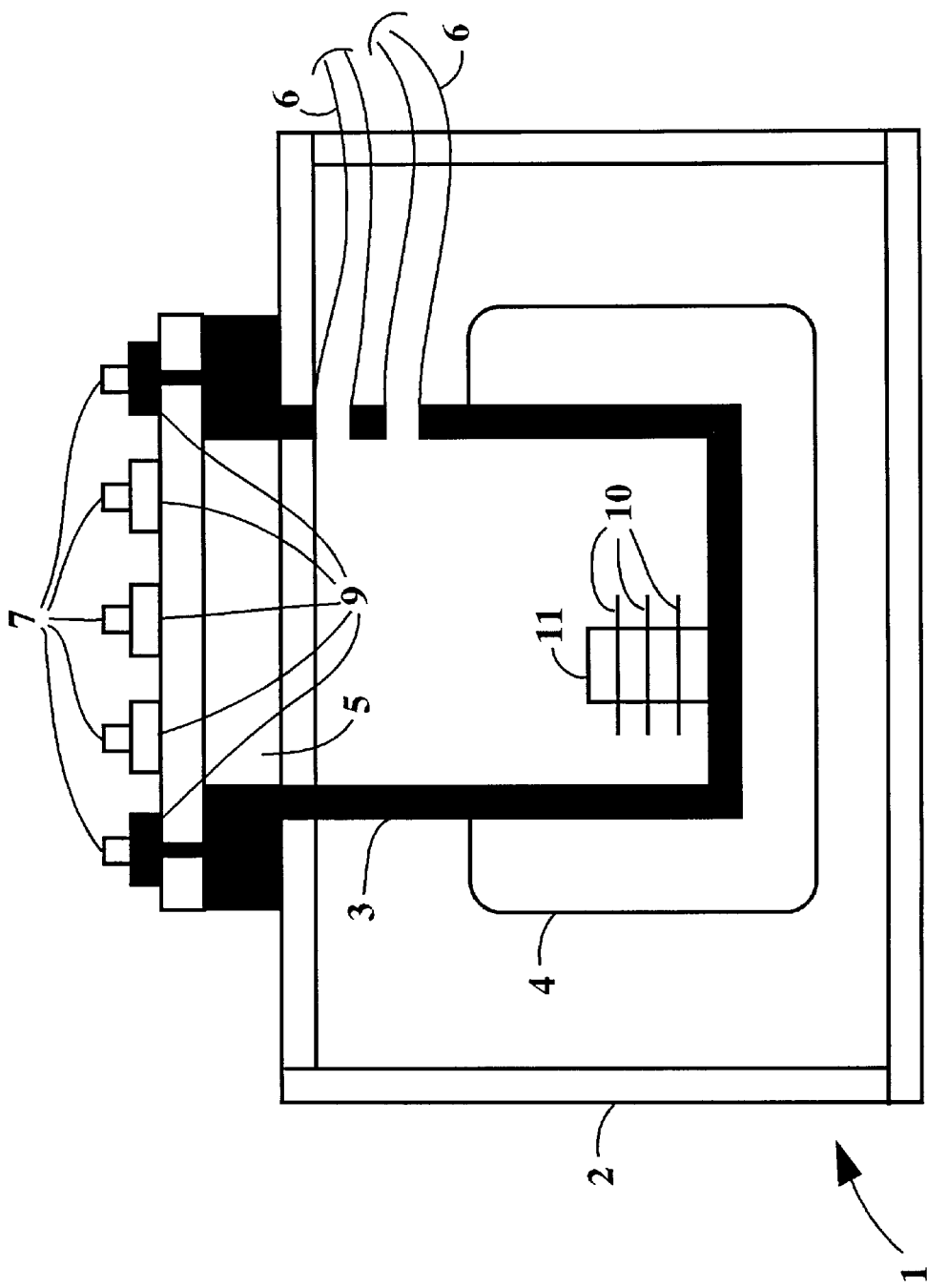
FIG. 1a (Prior Art) is a cross sectional view of a prior art autoclave.
Figure 1B:
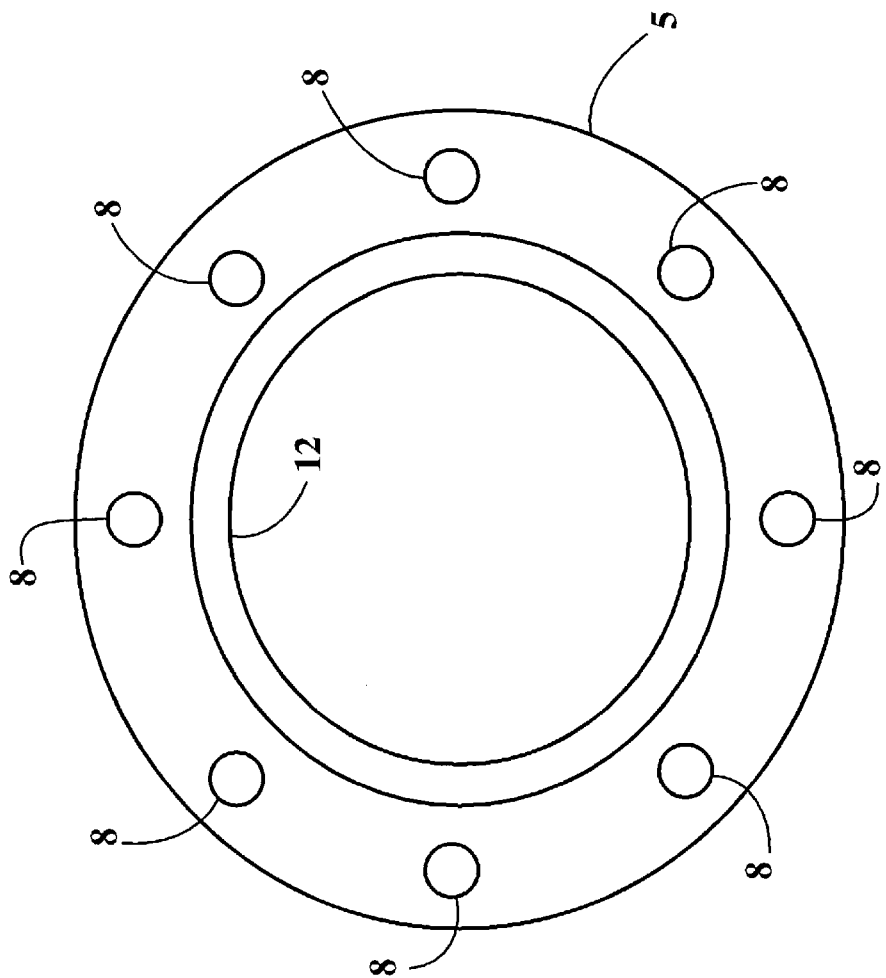
FIG. 1b (Prior Art) is a bottom view of a prior art door of an autoclave.
Figure 2:
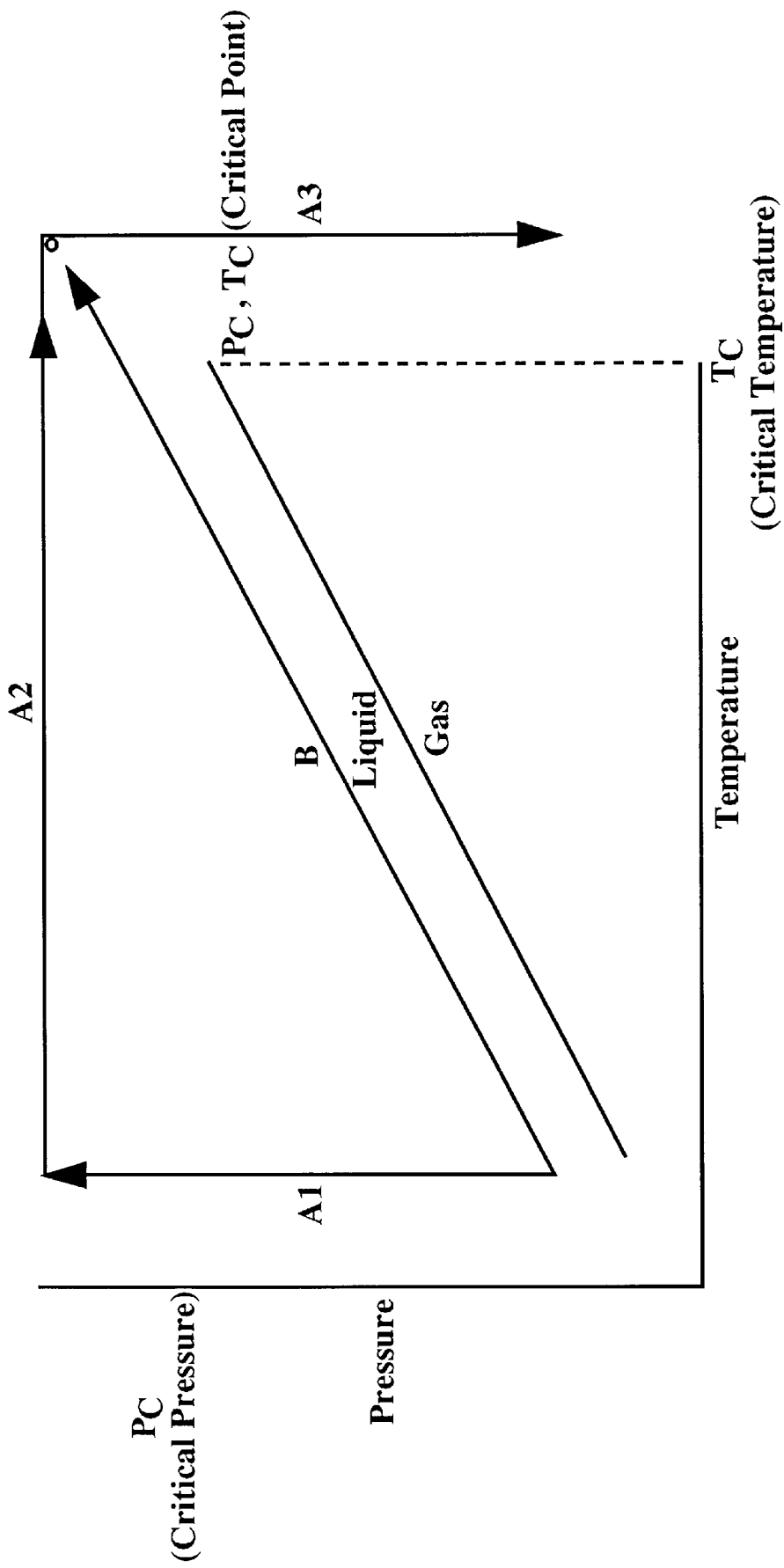
FIG. 2 is a diagram of pressure versus temperature for a supercritical heating process in accordance with the present invention.

In order to form highly porous aerogel, a solvent in a thin film is extracted out of the film supercritically. That is, a supercritical heating process is performed so as to remove the solvent without crossing the boundary between liquid and gas. FIG. 2 shows a pressure versus temperature diagram for a typical solvent, with Pc being the critical pressure and Tc being the critical temperature. In this diagram arrows A1 and A2 illustrate the path of the supercritical heating process. Arrow A3 represents the release of pressure on the autoclave. Referring now to arrows A1, A2, and A3, as can be seen in the diagram, the boundary between liquid and gas is not crossed during the supercritical heating process. In the supercritical heating process shown in FIG. 2, the solvent is extracted upon the release of pressure as shown by arrow A3, resulting in a highly porous aerogel.

Figure 3:
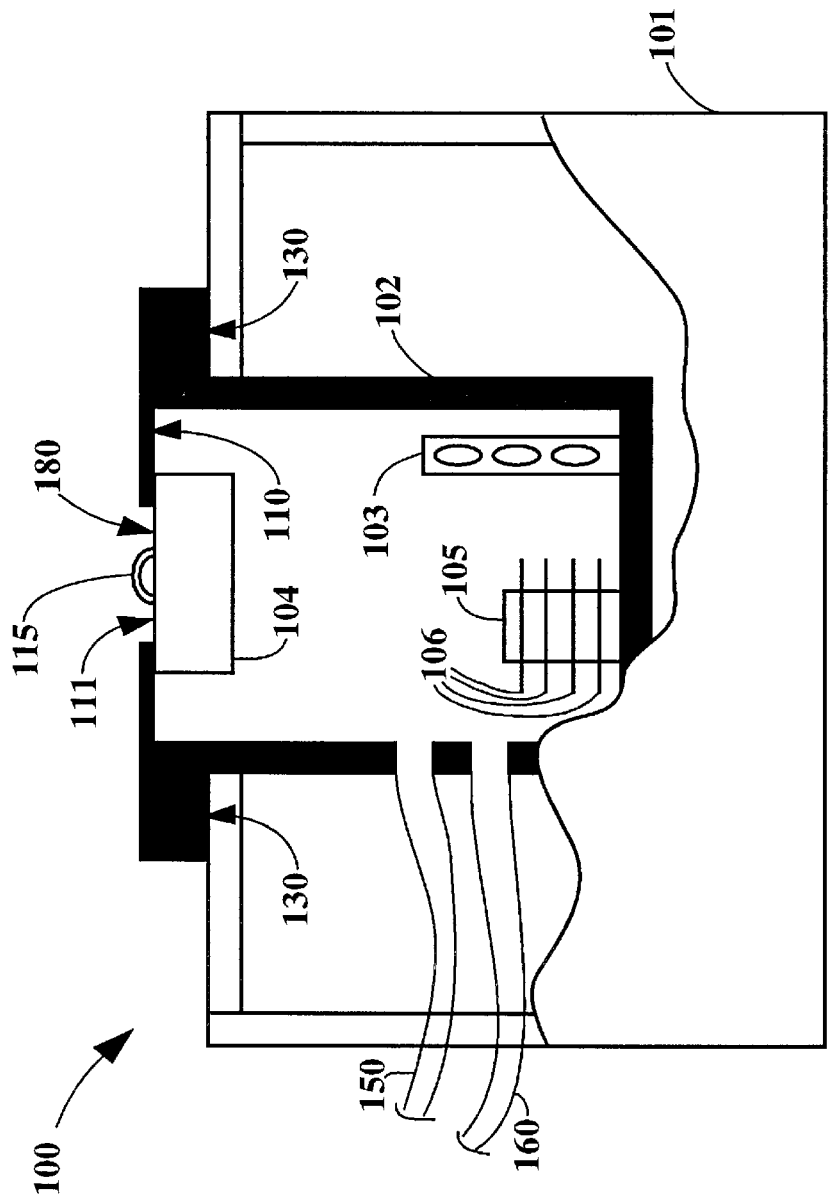
FIG. 3 is a cut-away side view of an autoclave which includes a door that is closed and a cassette tray holding semiconductor wafers in accordance with the present invention.

FIG. 3 shows an autoclave 100 to include frame 101 and pressure vessel 102. Pressure vessel 102 in includes flange 130 which extends around the top of pressure vessel 102. Flange 130 overlies portions of frame 101 so as to support pressure vessel 102 within frame 101. Pressure vessel 102 includes an inside surface, shown generally as inside surface 110. Door 104 is shown to form a seal against inside surface 110 of pressure vessel 102 so as to enclose the interior of pressure vessel 102. Heating system 103 is shown to be disposed within pressure vessel 102. Cassette tray 105 is also shown to be disposed within the interior of pressure vessel 102. Semiconductor wafers 106 are shown to be inserted into cassette tray 105. Top surface 111 of door 104 forms a seal against inside surface 110 of pressure vessel 102.

Figure 4:
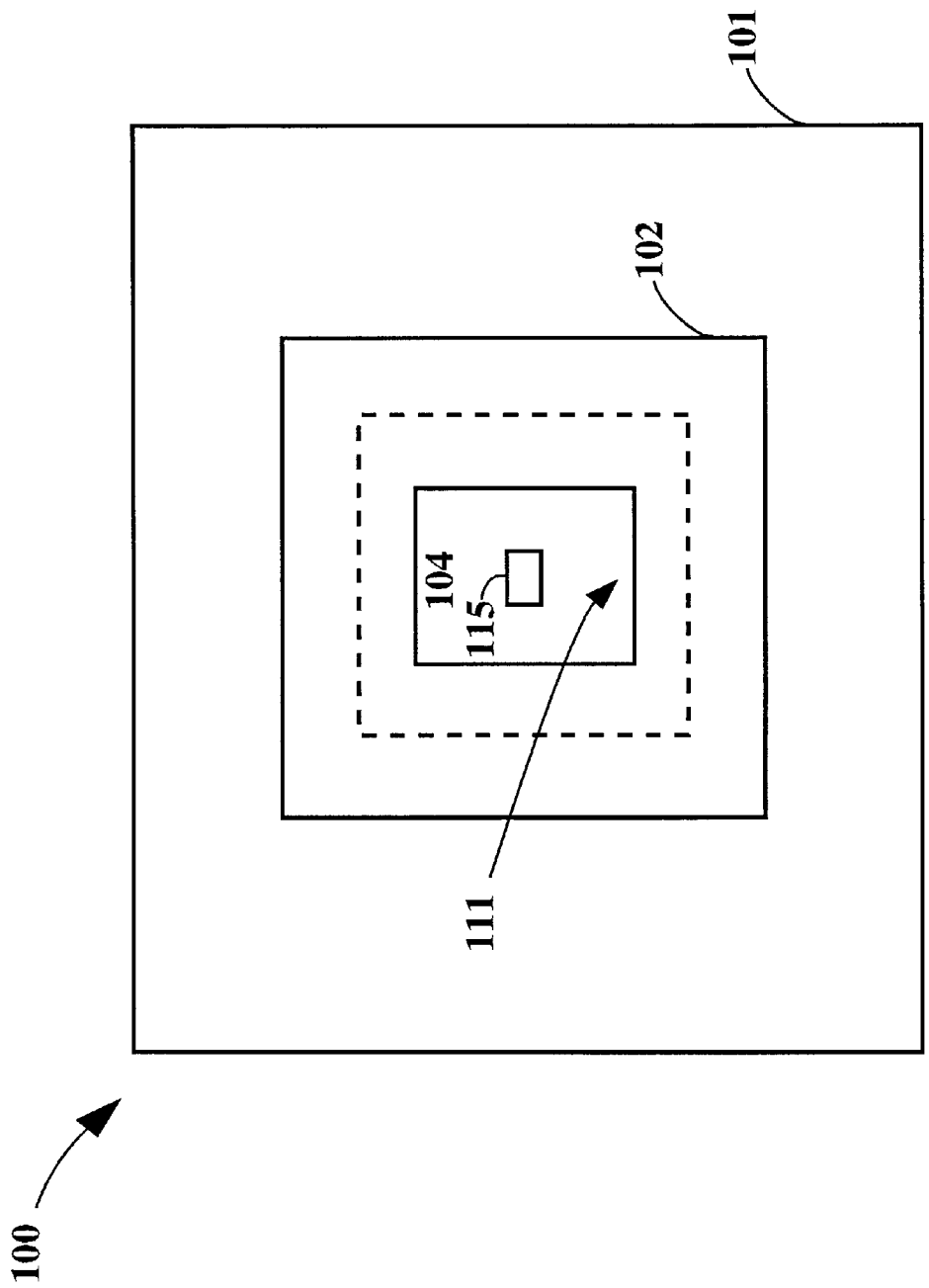
FIG. 4 is a top view of an autoclave which includes a door that is closed in accordance with the present invention.
Figure 5:
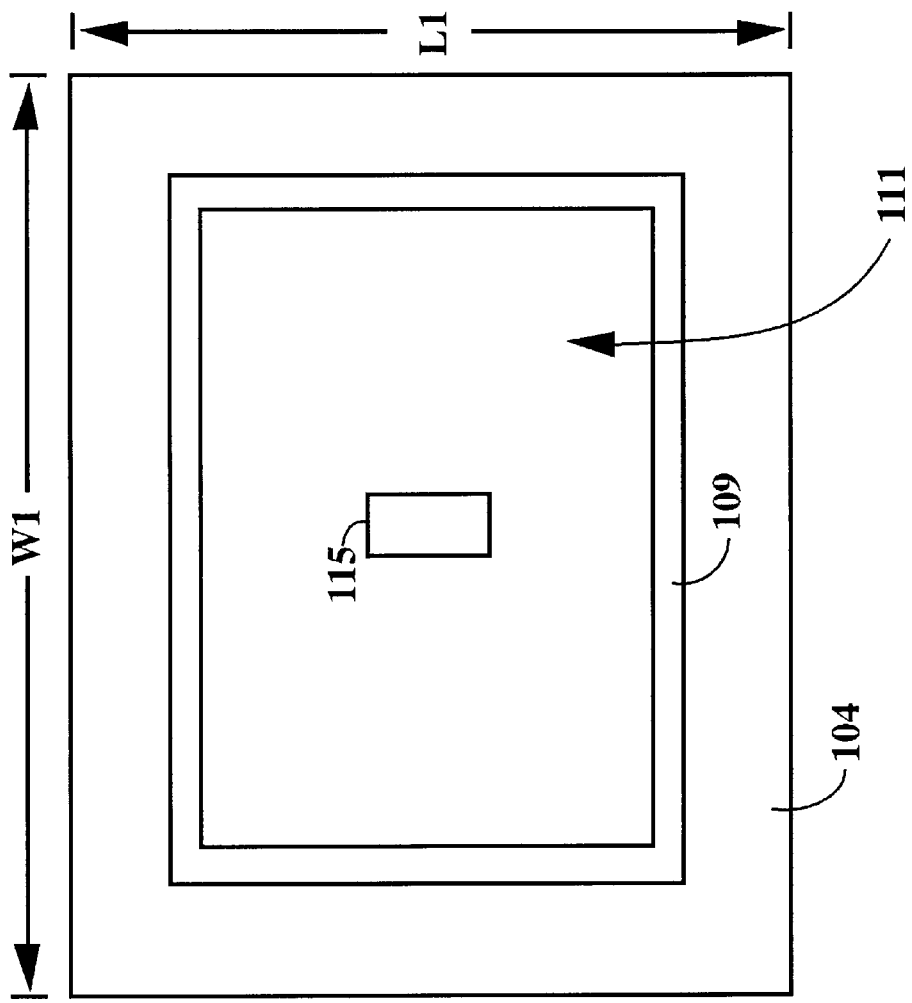
FIG. 5 is a top view of a door of an autoclave in accordance with the present invention.

With reference now to FIG. 4, autoclave 100 includes handle 115 which allows an operator to grasp door 104, With reference now to FIG. 5, top surface 111 of door 104 has a groove formed therein which receives an O-ring 109. In one embodiment of the present invention door 104 has a rectangular shape. Door 104 is shown to have width W1 and length L1. The rectangular shape of door 104 allows door 104 to be easily inserted into and removed from the interior of pressure vessel 102 of FIG. 4.

Figure 6:
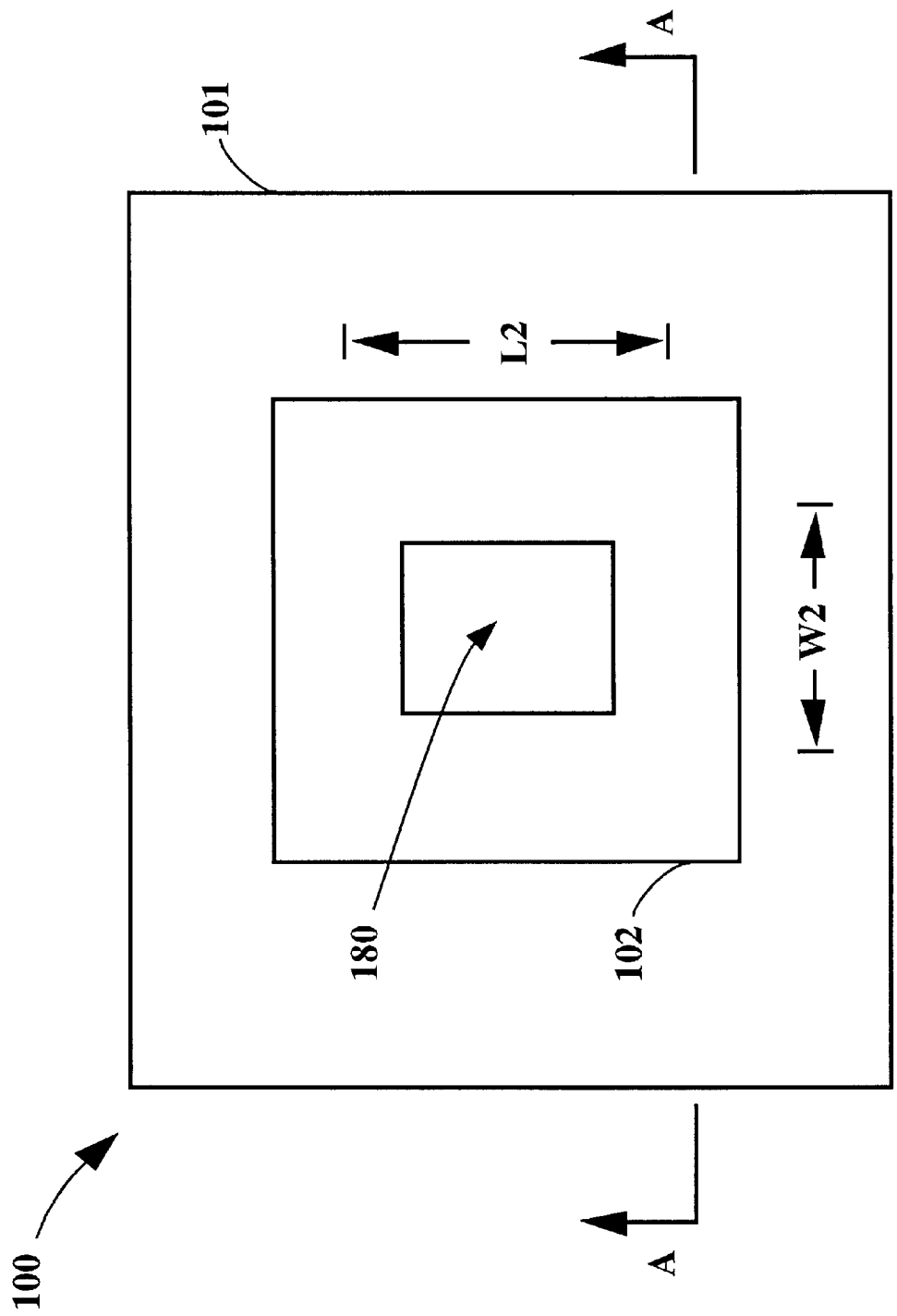
FIG. 6 is a top view of an autoclave which includes a door that is removed in accordance with the present invention.

FIG. 6 shows a top view of autoclave 100 after door 104 of FIGS. 3–4 is removed. The removal of door 104 exposes opening 180 in autoclave 100 such that items may be inserted into and removed from autoclave 100. Opening 180 has a length, shown as L2 and a width, shown as W2. The length and width of opening 180 are less than the length L1 and the width W1 of door 104 of FIG. 5 such that door 104 easily covers opening 180 of FIG. 6 and such that door 104 may be easily inserted into and removed from pressure vessel 102.

In one embodiment of the present invention, L1 of door 104 is greater than the L2 of opening 180 and the W1 of door 104 is greater than the W2 of opening 180 such that, when door 104 is aligned with opening 180, door 104 completely covers opening 180 and overlaps inside surface 110. Door 104 overlaps inside surface 110 sufficiently such that O-ring 109 forms a seal against inside surface 110 of pressure vessel 102.

Figure 7:
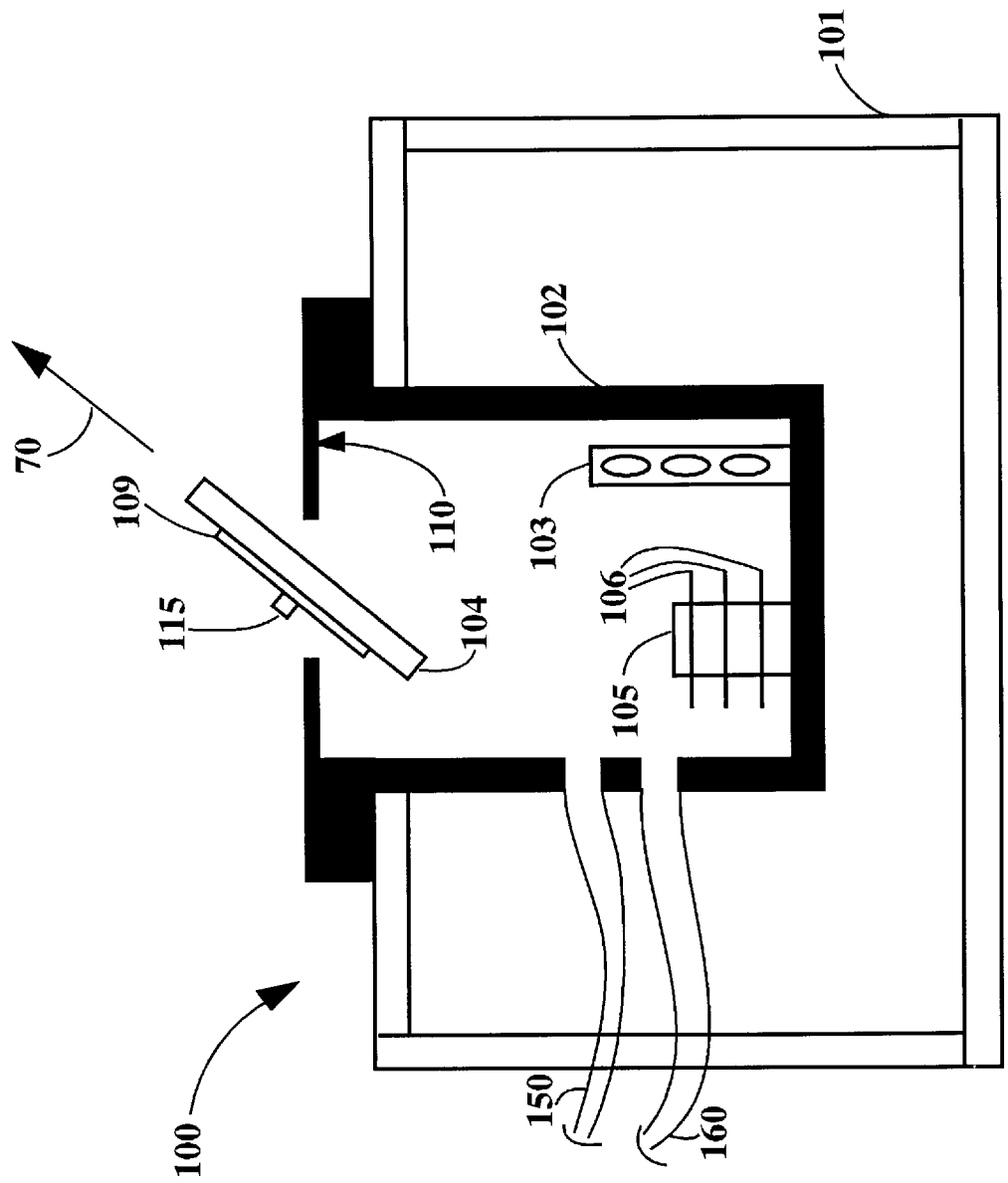
FIG. 7 is a cross sectional view along section A—A of FIG. 6 illustrating the removal of the door in accordance with the present invention.

Referring now to FIG. 7, door 104 is removed by rotating door 104 and pulling door 104 out of pressure vessel 102 as shown by arrow 70. This allows an operator to easily remove door 104 when required.

In operation, door 104 of FIGS. 3–7 must be held against inside surface 110 of pressure vessel 102 such that a seal forms when pressure vessel 102 is pressurized. After pressure vessel 102 is pressurized, pressure in pressure vessel 102 holds door 104 tightly in place. However, upon the release of pressure in pressure vessel 104, unless door 104 is held in place door 104 will fall into pressure vessel 102. This could lead to damage to cassette tray 105 and to semiconductors 106. Thus, it is desirable to hold door 104 in place prior to pressurization and immediately after pressure is released. Door 104 may either be held manually, or any of a number of different mechanisms may be used to hold door 104 in place.

Figure 8:
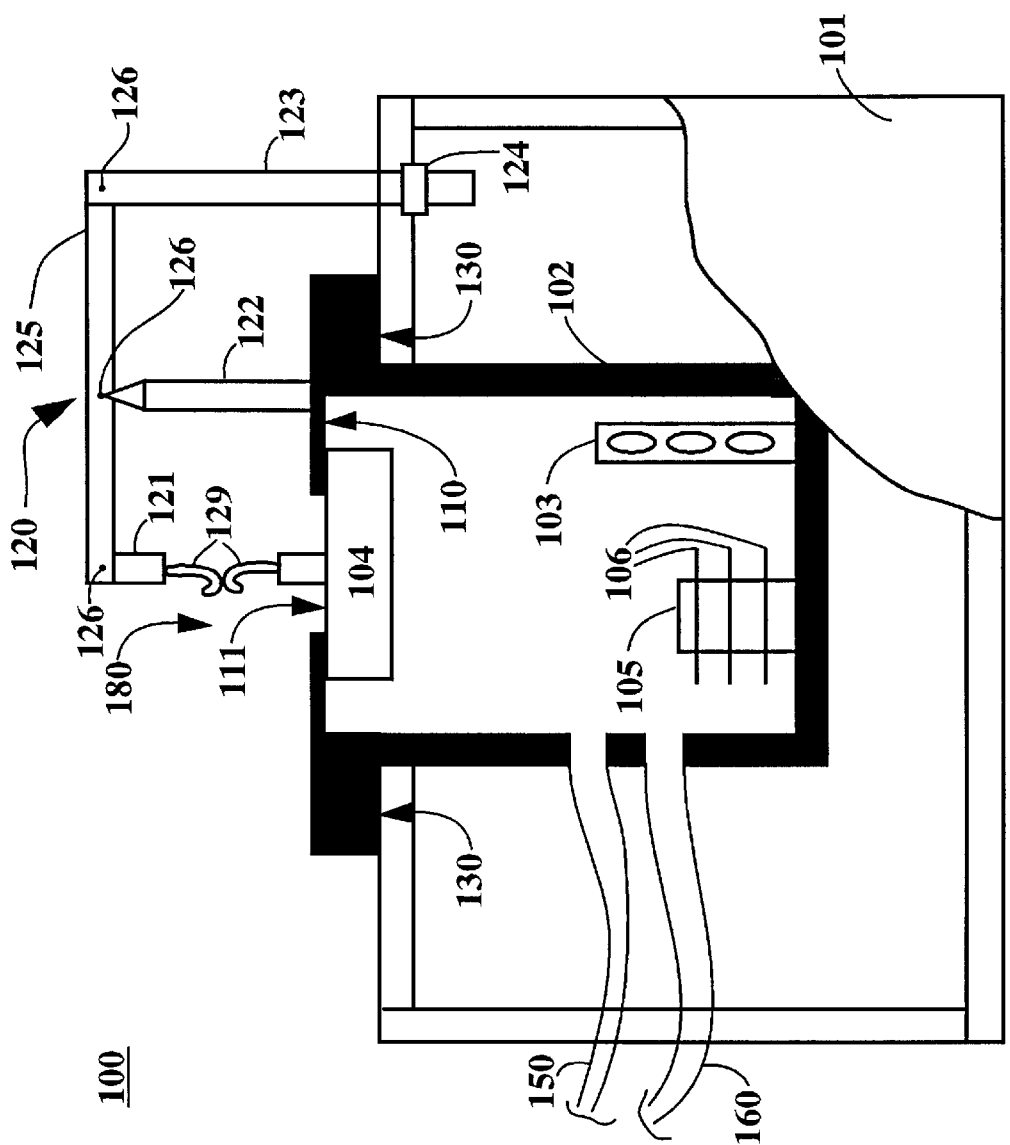
FIG. 8 is a side cut away view of an autoclave that includes a pivot holding assembly that is holding a door in the closed position in accordance with the present invention.

In one embodiment of the present invention, a pivoting holding assembly is used to hold door 104 in place. Referring now to FIG. 8, pivoting holding assembly 120 is connected to door 104 so as to hold door 104 against interior surface 110 prior to the application of pressure to pressure vessel 102. Holding assembly 120 includes pivot bar 122, pivot arm 125, vertical coupling 123, attachment fitting 124, and vertical coupling 121. In one embodiment of the present invention, vertical coupling 121 includes hooks 129 for selectively uncoupling door 104. In one embodiment of the present invention, attachment fitting 124 is a nut that engages screw threads on vertical coupling 123. In this embodiment, pins 126 allow pivot arm 125 to pivot about pivot bar 122. Vertical couplings 121 and 123 are attached to opposite ends of pivot arm 125 via pins 126 such that vertical couplings 121 and 123 may pivot relative to pivot arm 125.

Figure 9:
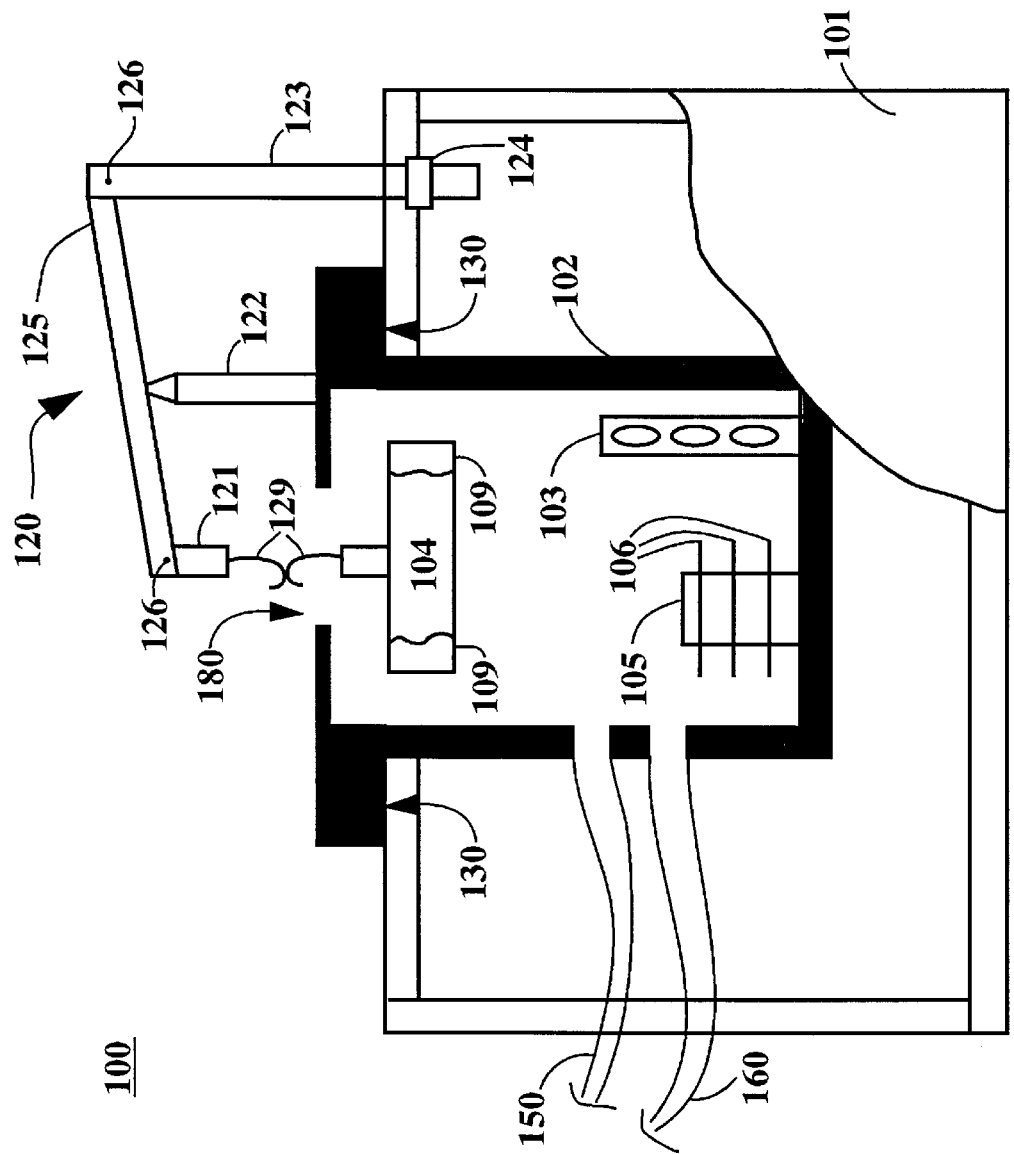
FIG. 9 is a side cut away view of an autoclave that includes a pivot holding assembly that is holding a door in the open position in accordance with the present invention.

Attachment fitting 124 may be loosened so as to allow pivot bar 125 to pivot about pivot bar 122. Upon the loosening of attachment fitting 124, pivot holding assembly 120 moves into the open position. Referring now to FIG. 9, in the open position, pivoting holding assembly 120 moves door 104 such that door 104 may be moved aside so as to allow for items to be inserted into and removed from pressure vessel 102. Also, hooks 129 may be uncoupled and door 104 may then be removed.

Figure 10:
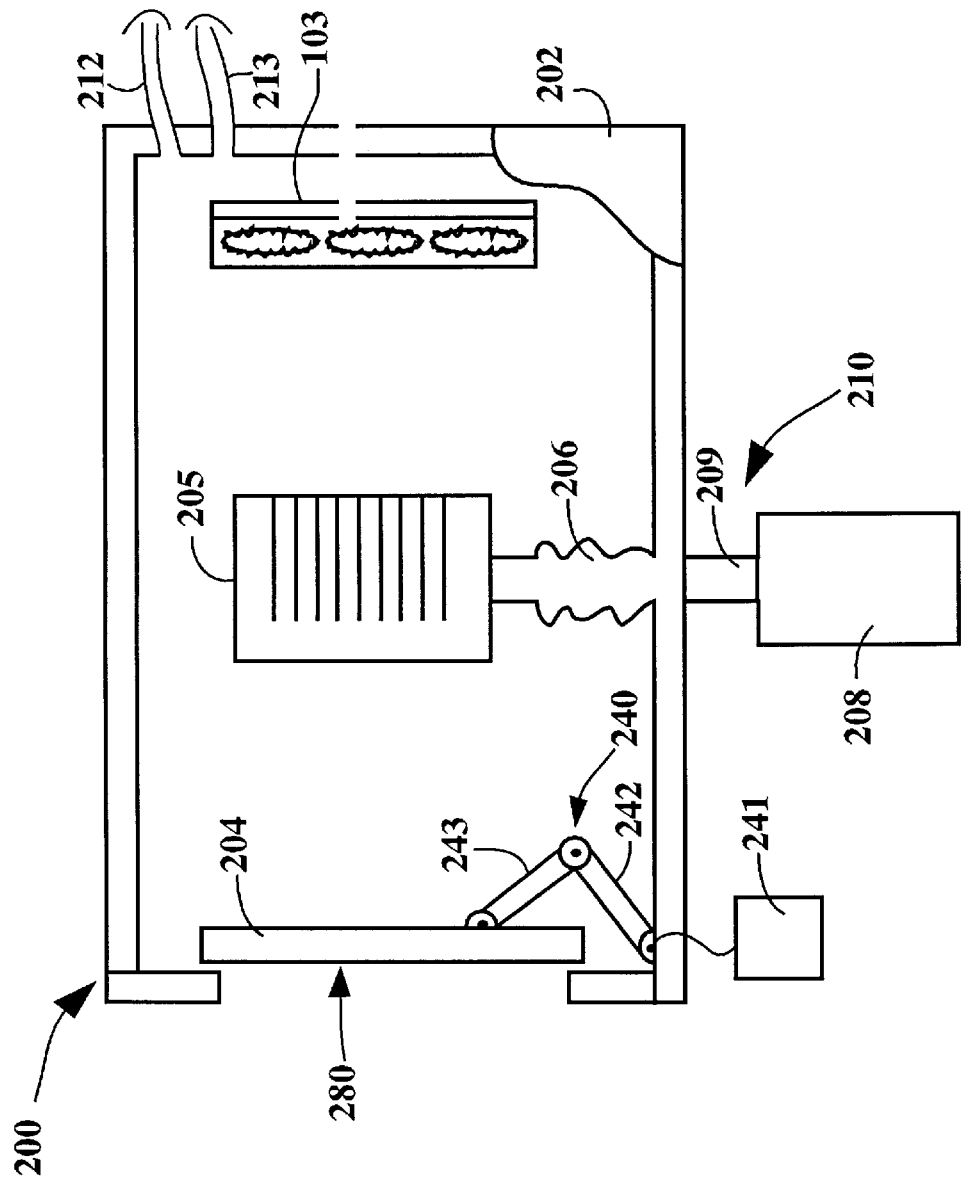
FIG. 10 is a cut-away side view of an autoclave that includes a robotic system that is holding a door in the closed position in accordance with the present invention.

FIG. 10 shows an embodiment that includes an autoclave 200 which has a door 204 which seals against the side of a pressure vessel 202. Side opening 280 in pressure vessel 202 is shown to be covered by door 204. The movement of door 204 is controlled by robotic system 240. Robotic system 240 includes attachment arm 243 and base arm 242. Base arm 242 is coupled to pressure vessel 202 on one end such that it may freely pivot and is coupled to attachment arm 243 on its other end such that attachment arm 243 may freely pivot relative to base arm 242. Attachment arm 243 is pivotally coupled to door 204 such that attachment arm 243 and door 204 may pivot. The movement of door 204 is controlled automatically by control system 241 which controls the movement of attachment arm 243 and base arm 242. In one embodiment robotic system 240 a electropneumatic system such that control system 241 controls the movement of attachment arm 243 and base arm 242 from outside of pressure vessel 202.

Continuing with FIG. 10, cassette tray 205 is connected to robotic system 210 which moves cassette tray 205 up and down within pressure vessel 202. In one embodiment, robotic system 210 includes control system 208 which may be activated so as to move rod 209 up and down. Rod 209 is connected at its upper end to cassette tray 205 such that the movement of rod 209 moves cassette tray 205. Robotic system 210 also includes bellows 206 which allows rod 209 to freely move up and down while maintaining a pressure seal within pressure vessel 202.

Figure 11:
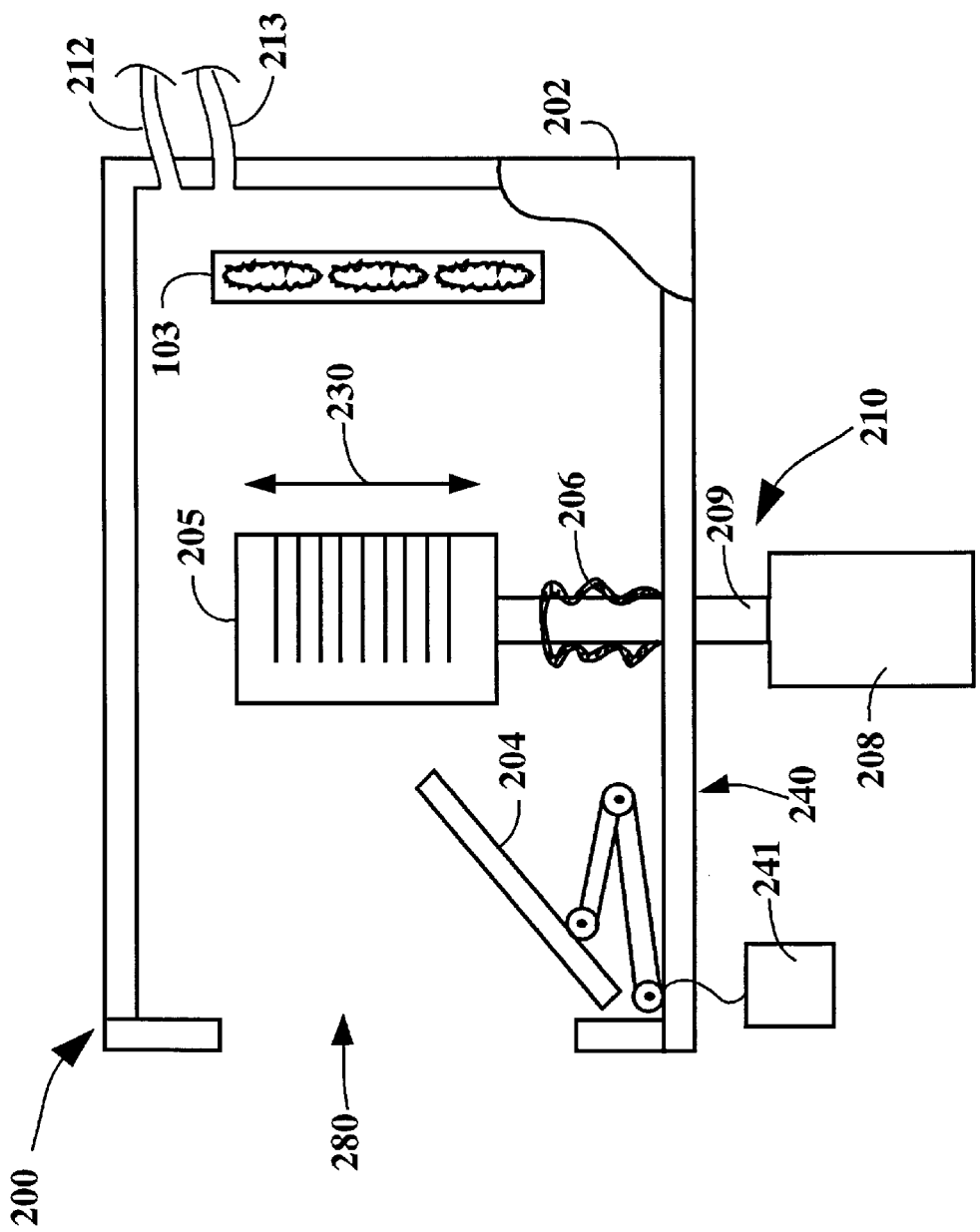
FIG. 11 is a cut-away side view of an autoclave that includes a robotic system that is holding a door in the open position in accordance with the present invention.

Now referring to FIG. 11, in operation, robotic system 240 moves door 204 such that opening 280 in pressure vessel 202 is uncovered. In the open position, semiconductor wafers may be easily loaded into cassette tray 205 using automated handling devices (not shown). As required during the loading process, cassette tray 205 is moved up and down as illustrated by arrow 230 to load semiconductor wafers thereon. Once cassette tray 205 is loaded, robotic system 240 is engaged so as to move door 204 back into the closed position.

With reference back to FIG. 10, in the closed position, door 204 covers opening 280 in pressure vessel 202. Gas is pumped into pressure vessel 202 through tube 212 so as to force door 204 against the inside surface of pressure vessel 202 so as to form an airtight seal. Gas is pumped into pressure vessel 202 until the desired pressure is obtained. In one embodiment, an inert gas such as nitrogen is used for pressurizing pressure vessel 202. Heating system 103 is engaged so as to provide the required temperature to the semiconductor wafers in cassette tray 205. Heating system 103 is contained within pressure vessel 202. Thus, heat is directly applied to the semiconductor wafers in cassette tray 205. This is more efficient than prior art autoclaves because there is no need to heat the entire autoclave. This allows for more rapid heating of the semiconductor wafers contained in cassette tray 205. Once the curing process is complete, pressure is removed through tube 213 and door 204 is moved back into the open position by robotic system 240. The cured semiconductor wafers may then be removed from autoclave 200. The removal process is facilitated by the movement of robotic system 240 such that cassette tray 205 is moved up and down as required.

Figure 12:
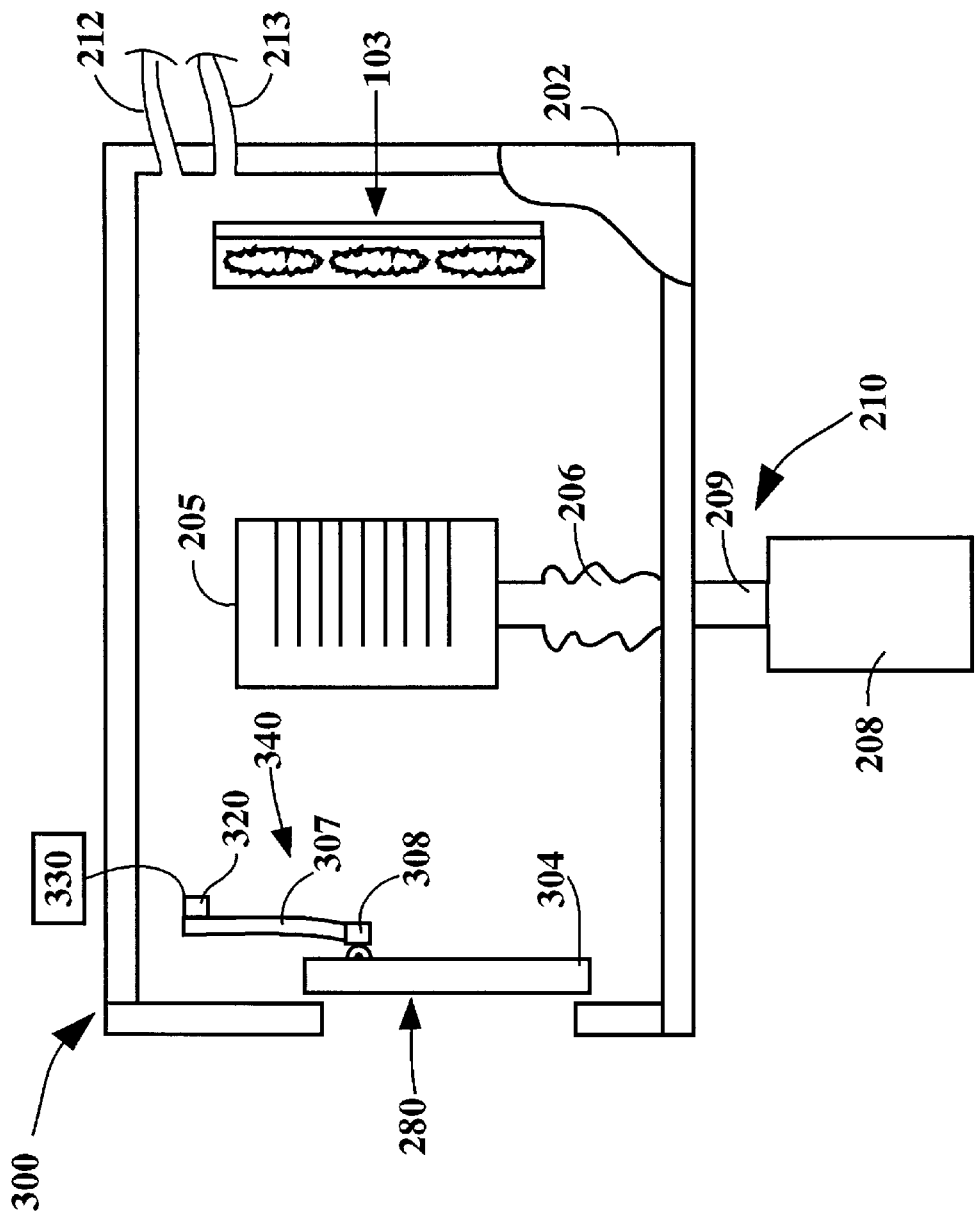
FIG. 12 is a cut-away side view of an autoclave that includes a robotic system that uses a rail for moving a door and in which the door is shown in the closed position in accordance with the present invention.
Figure 13:
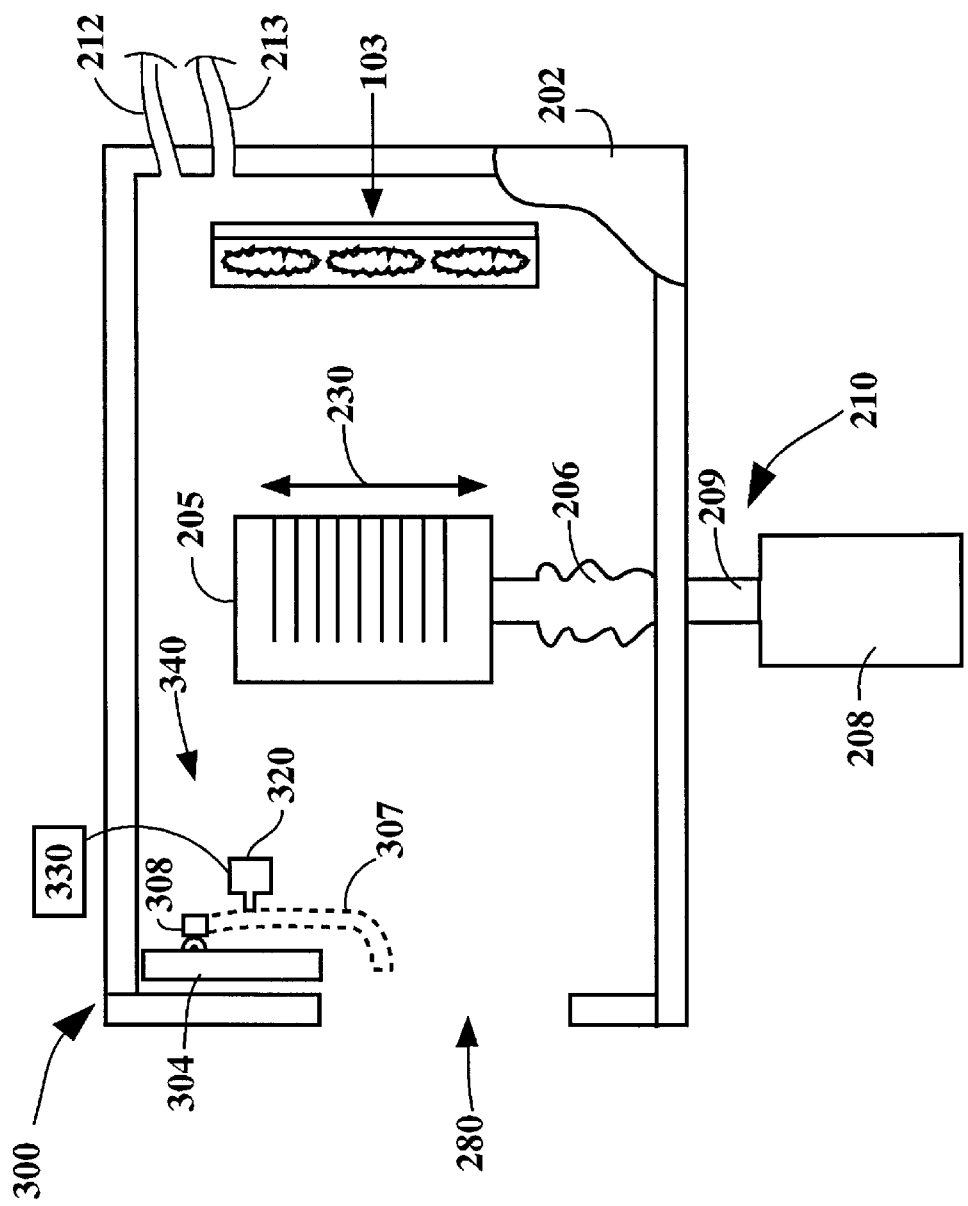
FIG. 13 is a cut-away side view of an autoclave that includes a robotic system that uses a rail for moving a door and in which the door is shown in the open position in accordance with the present invention.
Figure 14:
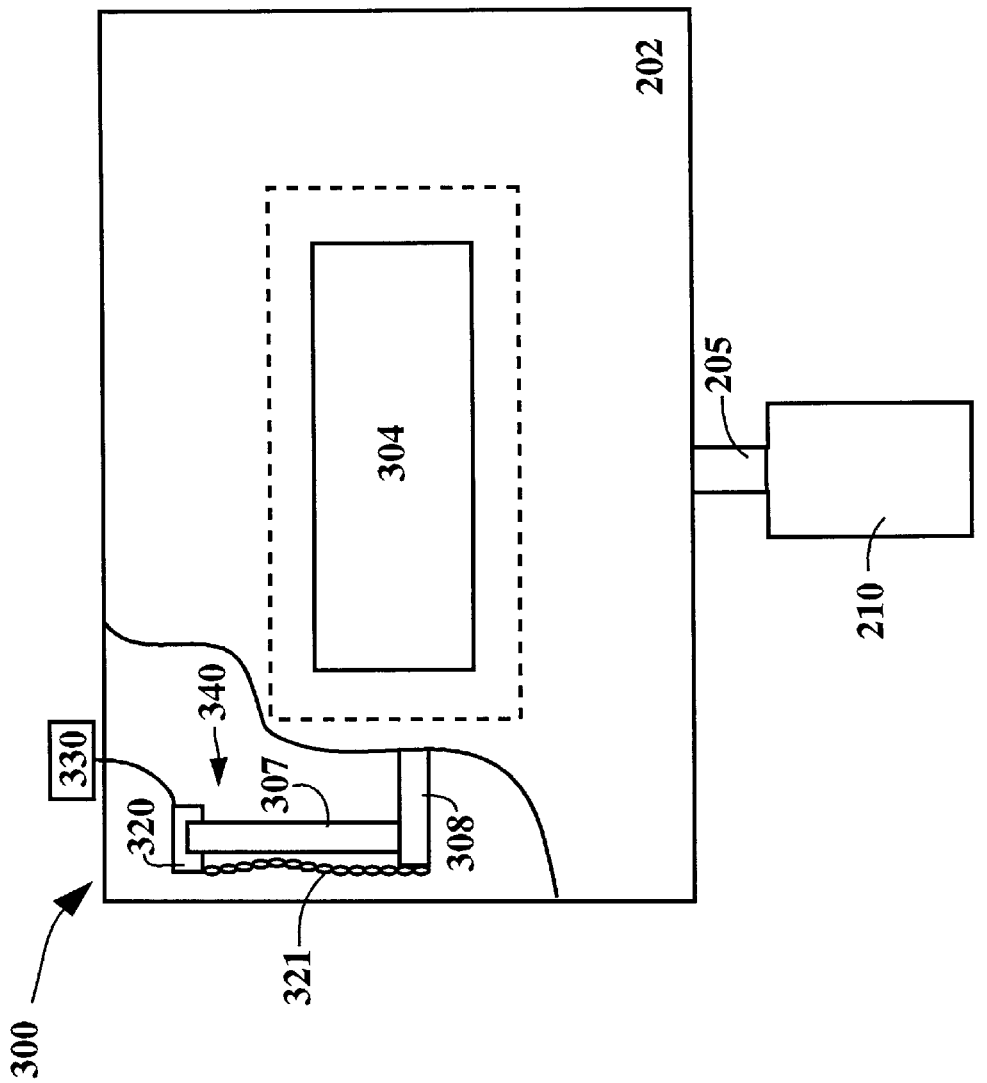
FIG. 14 is a cut-away front view of an autoclave that includes a robotic system that uses a rail for moving a door and in which the door is shown in the open position in accordance with the present invention.

FIGS. 12–14 illustrate an embodiment which includes a robotic system 340 which includes a rail for moving a door 304. Autoclave 300 is shown to include a door 304 which is moved via a robotic system 340 from an open position to a closed position. With reference to FIG. 12, in the closed position, door 304 covers an opening 280 in the side of autoclave 202. When door 304 is moved into the open position as is shown in FIG. 13, opening 280 is uncovered so as to allow for semiconductor wafers to be easily inserted into and removed from cassette tray 205.

Referring now to FIG. 14, robotic system 340 includes rail 307 along which bar 308 travels. Bar 308 is connected at one end to door 304 such that door 304 moves with the movement of bar 308. The movement of bar 308 is controlled by control system 330. In one embodiment, control system 330 is electropneumatic such that the movement of bar 308 is controlled by a electropneumatically operated mechanism 320 which moves chain 321 so as to move bar 308 along rail 307.

Though the embodiment shown in FIGS. 12–14 show the use of robotic system 210 for moving cassette tray 205 up and down, in one embodiment (not shown) cassette tray 205 does not move. Instead, opening 280 is sufficiently large so as to allow the robotic arm of the wafer handling system to move with sufficient freedom to place wafers on the different levels of cassette tray 205.

Though a hand operated system (FIGS. 3–7), a hand operated mechanically assisted system (FIGS. 8–9), a robotic system which includes pivoting arms (FIGS. 10–11), and a robotic system which includes a rail (FIGS. 12–14) are shown to be used for controlling the movement of the door of the autoclave, the autoclave of the present invention is well adapted for use with other methods and systems for controlling the movement of the door.

Because the door of each of autoclaves 100, 200, and 300 of FIGS. 3–14 seals against the inside of each of pressure vessel, there is no need to carefully tighten multiple individual bolts in order to obtain an effective seal as is required by prior art autoclaves. This allows for easily sealing and unsealing of autoclaves 100, 200, and 300 so as to allow for rapid processing of semiconductor wafers, increasing throughput and efficiency. In addition, because heating system 103 of FIGS. 3–14 directly heats semiconductor wafers, faster processing and increased efficiency is obtained. Thus, the autoclave of the present invention allows for the mass manufacture of semiconductor wafers containing aerogel films.

Door 204 and door 304 of FIGS. 10–14 are shown to directly seal against the interior wall of pressure vessel 202. However, doors 204 and 304 are well adapted for use with sealing mechanisms such as O-ring seals and gasket-type seals, etc. for assuring that an effective seal is maintained during the curing process.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order best to explain the principles of the invention and its practical application, to thereby enable others skilled in the art best to utilize the invention and various embodiments with various modifications as are suited to the particular use contemplated. It is intended that the scope of the invention be defined by the Claims appended hereto and their equivalents.

I claim:

1. A method for applying heat and pressure to semiconductor wafers comprising:

providing a pressure vessel having an opening disposed therein and having an inside surface and an outer surface;

providing a cassette tray disposed within said pressure vessel;

providing a robotic system coupled to said cassette tray for moving said cassette tray up and down within said pressure vessel;

providing a door adapted to cover said opening in said pressure vessel;

placing said door within said pressure vessel and around said opening in said pressure vessel such that said door covers said opening in said pressure vessel;

pressurizing said pressure vessel such that said door forms a seal against said inside surface of said pressure vessel;

providing a heating system disposed within said pressure vessel; and engaging said heating system so as to apply heat within said pressure vessel.

2. The method for applying heat and pressure to a semiconductor wafer of claim 1 further comprising the step of:

inserting semiconductor wafers into said cassette tray when said door is open, said robotic system moving said cassette tray up and down so as to facilitate the insertion of semiconductor wafers into said cassette tray.

3. The method of applying heat and pressure to a semiconductor wafer of claim 2 wherein said heating system heats said cassette tray to a temperature in excess of 100 degrees centigrade and said pressure vessel applies a pressure in excess of 1500 pounds per square inch.

4. An autoclave for heating semiconductor wafers comprising:

a pressure vessel, said pressure vessel having an opening disposed therein;

a heating system disposed within said pressure vessel, said heating system adapted to provide heat;

a door disposed within said pressure vessel, said door having a shape adapted to cover said opening in said pressure vessel such that said pressure vessel may be sealed by covering said opening in said pressure vessel with said door and applying pressure to said pressure vessel;

a robotic system coupled to said door such that said robotic system can move said door so as to selectively cover and uncover the opening in said pressure vessel; and a cassette tray disposed within said pressure vessel adjacent said heating system, said cassette tray coupled to a robotic system such that said cassette tray moves up and down within said pressure vessel such that semiconductor wafers can be easily inserted and removed from said cassette tray.

5. The autoclave of claim 4 wherein said heating system heats said cassette tray to a temperature in excess of 100 degrees centigrade and said pressure vessel applies a pressure in excess of 1500 pounds per square inch.

* * * * *